United States Patent [19]
Kawasaki et al.

[11] Patent Number: 5,332,598
[45] Date of Patent: Jul. 26, 1994

[54] PROCESS FOR THE PRODUCTION OF LANTHANUM CHROMITE FILMS BY PLASMA SPRAYING

[75] Inventors: Shinji Kawasaki; Makoto Murai; Yasufumi Aihara, all of Nagoya, Japan

[73] Assignee: NGK Insulators, Ltd., Japan

[21] Appl. No.: 984,456

[22] Filed: Dec. 2, 1992

[30] Foreign Application Priority Data

Dec. 4, 1991 [JP] Japan .................. 3-320584
Nov. 24, 1992 [JP] Japan .................. 4-313584

[51] Int. Cl.$^5$ .......................... B05D 1/08; B05D 5/12
[52] U.S. Cl. ............................ 427/453; 427/115; 427/126.3; 427/376.2
[58] Field of Search .............. 427/453, 115, 126.3, 427/376.2

[56] References Cited

U.S. PATENT DOCUMENTS

| | | | |
|---|---|---|---|
| 4,156,661 | 5/1979 | Brodmann et al. | 252/521 |
| 4,614,628 | 9/1986 | Hsu et al. | 264/61 |
| 4,749,632 | 6/1988 | Flandermeyer et al. | 29/623.3 |
| 4,988,538 | 1/1991 | Horvei et al. | 427/453 |
| 5,143,751 | 9/1992 | Richards et al. | 427/126.3 |

FOREIGN PATENT DOCUMENTS

| | | |
|---|---|---|
| 0447717 | 9/1991 | European Pat. Off. |
| 61-198569 | 9/1986 | Japan . |
| 61-198570 | 9/1986 | Japan . |
| 88/03332 | 5/1988 | World Int. Prop. O. |

OTHER PUBLICATIONS

Sunshine Journal, 1981, vol. 2, No. 1, pp. 26-37 (no month date).
The 32nd Battery Symposium in Japan, Sep. 17-19, 1991, Kyoto.
Patent Abstracts of Japan, vol. 015, No. 062 (E-1033) 28 Apr. 1989 & JP-A-22 88 160 (Fujikura) 28 Nov. 1990.

*Primary Examiner*—Shrive P. Beck
*Assistant Examiner*—Katherine A. Bareford
*Attorney, Agent, or Firm*—Parkhurst, Wendel & Rossi

[57] ABSTRACT

A process for the production of a lanthanum chromite film, including the steps of preparing a plasma spray powder by mixing 1-15 parts by weight of powdery chromium oxide powder to 100 parts by weight of powdery lanthanum chromite, this lanthanum chromite having a composition ratio of A sites to B-sites being in a range of 1:1 to 1:0.9, forming a plasma sprayed film by plasma spraying the plasma spray powder onto a substrate, and forming the lanthanum chromite film by heat treating the resulting plasma sprayed film. The plasma spray powder may be produced by preparing a mixed powder by adding 1-15 parts by weight of powdery chromium oxide to 100 parts by weight of a synthesis powder capable of producing the lanthanum chromite film by heat treatment, the synthesis powder containing at least chromium oxide and lanthanum chromite and the lanthanum chromite film having a composition ratio of A-sites to B-sites being in a range of 1:1 to 1:0.9, obtaining a synthesized product by heating the mixed powder, and granulating the synthesized product.

12 Claims, 2 Drawing Sheets

PROCESS FOR THE PRODUCTION OF LANTHANUM CHROMITE FILMS BY PLASMA SPRAYING

BACKGROUND OF THE INVENTION (1) Field of the Invention

The present invention relates to a process for the production of a lanthanum chromite film.

(2) Related Art Statement

Recently, fuel cells have attracted attention as power generators. The fuel cell is a device capable of directly converting a chemical energy possessed by a fuel to an electric energy, and is free from the limitation of the Carnot cycle. Thus, the fuel cell essentially has a high energy conversion efficiency, and a variety of fuels such as naphtha, natural gas, methanol, coal-reformed gas and heavy oil can be used. Further, the fuel cell produces of low pollution, and its power-generating efficiency is not influenced by a scale of a plant. Therefore, the fuel cell is an extremely promising technique.

In particular, since the solid oxide fuel cell (SOFC) operates at a high temperature of around 1,000° C., electrode reaction is extremely active, and thus the fuel cell does not need a catalyst of a noble metal such as precious platinum. In addition, polarization is small, and output voltage is relatively high, and the energy-converting efficiency of the SOFC is higher as compared with other fuel cells. Furthermore, since all the constituent materials are solid, the SOFC is stable, and has a long use life.

In such an SOFC, a fuel electrode and an air electrode of adjacent SOFC elements (cell units) are generally connected in series through an interconnector and a connection terminal. Therefore, it is particularly demanded that the interconnector is provided in the form of a thin film to reduce its electric resistance.

As a technique for producing a thin film of the interconnector, chemical vapor deposition (CVD) or electrochemical vapor deposition (EVD) may be employed. However, such depositions require large scale film-forming apparatuses, and a treating speed and an area where the deposition can be made are too small.

A process for the production of the solid oxide fuel cell by using plasma spraying possesses the merits that the process has a high film-forming speed, is simple, and can form a thin and relatively dense film. For this reason, this process has been conventionally employed (Sunshine Journal, vol. 2, No. 1).

For example, a process is known in which a raw material for use in plasma spraying (hereinafter referred to as "plasma spray raw material") is prepared by solid solving cerium oxide or zirconium oxide and an oxide of a metal such as an alkaline earth metal or a rare earth element, and a solid electrolyte film is formed by plasma spraying this raw material after the grain size is adjusted (Japanese patent application Nos. 61-198,569 and 61-198,570).

However, since the porosity of the plasma sprayed film is generally great, gas tightness is insufficient for the interconnector of the SOFC. Cracks or layered defects occur in the film during the plasma spraying. Accordingly, a fuel such as hydrogen or carbon monoxide leaks through the interconnector during the operation of the SOFC, so that the electromotive force per cell unit of the SOFC becomes lower than, for example, 1 V in the ordinary case, output drops, and the conversion rate from the fuel to the electric power decreases.

It may be considered that such a leakage of the fuel is compensated by increasing the thickness of the film interconnector. However, in this case, the resistance of the cell becomes greater, and the output of the cell drops. Therefore, a process is desired, which can densify the interconnector, and can make the interconnector as thin as possible provided that no fuel leakage occurs, and can increase the output of the cell.

It is published in Cell Debate, September, 1991, page 205 that lanthanum calcium chromite is plasma sprayed onto a surface of a substrate made of lanthanum manganite, and then a dense lanthanum chromite film is produced by heat treating the plasma sprayed film, and that this dense film is used as an interconnector of an SOFC.

Before this publication, NGK Insulators, Ltd. developed a technique for densifying a lanthanum chromite film by heating a plasma sprayed lanthanum chromite film, and filed a patent application for this technique (Japanese patent application No. 3-25,245 filed on Jan. 28, 1991).

However, the present inventors have further examined this technique, and found out a new problem.

That is, it is found out that when the lanthanum chromite is formed by plasma spraying, a part of a chromium component is evaporated during the plasma spraying so that the chromite film suffers deficiency of the chromium component. Consequently, lanthanum oxide or calcium oxide precipitates in the plasma sprayed film to increase electric resistance. Further, since lanthanum oxide has remarkably high hygroscopicity, lanthanum oxide is chemically changed to lanthanum hydroxide in the sprayed film through absorption of moisture. This chemical change is accompanied by a volume change to break the lanthanum chromite film. For this reason, the lanthanum chromite film in which lanthanum oxide or calcium oxide is precipitated cannot be practically employed.

SUMMARY OF THE INVENTION

It is an object of the present invention to provide a process for producing a single phase lanthanum chromite film having high electric conductivity by preventing the precipitation of lanthanum oxide or calcium oxide in the lanthanum chromite film.

It is another object of the present invention to provide such a single phase lanthanum chromite film having high electric conductivity.

It is a further object of the present invention to increase output of an SOFC by applying such a lanthanum chromite film in the SOFC.

The present invention is directed to a process for the production of a lanthanum chromite film, said process comprising the steps of preparing a powder for use in plasma spraying (herein referred to as "plasma spray powder") by mixing 1-15 parts by weight of powdery chromium oxide to 100 parts by weight of powdery lanthanum chromite, said lanthanum chromite having a composition ratio of A-sites to B-sites being in a range of 1:1 to 1:0.9, forming a plasma sprayed film by plasma spraying said plasma spray powder onto a substrate, and forming the lanthanum chromite film by heat treating the resulting plasma sprayed film.

The present invention is further directed to a process for producing a lanthanum chromite film, said process comprising the steps of preparing a mixed powder by adding 1-15 parts by weight of powdery chromium oxide to 100 parts by weight of a synthesis powder capable of producing said lanthanum chromite film by heat treatment, said synthesis powder containing at least chromium oxide and lanthanum oxide and said lanthanum chromite film having a composition ratio of A-sites to B-sites being in a range of 1:1 to 1:0.9, obtaining a synthesized product by heating said mixed powder, preparing a plasma spray powder by granulating said synthesized product, forming a plasma sprayed film onto a substrate by plasma spraying said plasma spray powder onto said substrate, and forming the lanthanum chromite film by heat treating the resulting plasma sprayed film.

The present invention is still further directed to a process for producing a lanthanum chromite film, said process comprising the steps of preparing a mixed powder by adding 1–15 parts by weight of powdery chromium oxide to 100 parts by weight of a raw material powder capable of producing said lanthanum chromite film by heat treatment, said raw material powder containing at least chromium oxide and lanthanum oxide and said lanthanum chromite film having a composition ratio of A-sites to B-sites being in a range of 1:1 to 1:0.9, obtaining a plasma spray powder by granulating said mixed powder, forming a plasma sprayed film onto a substrate by plasma spraying said plasma spray powder onto said substrate, and forming the lanthanum chromite film by heat treating the resulting plasma sprayed film.

The present invention is further directed to a lanthanum chromite film being free from precipitation of lanthanum oxide and having a composition ratio of A-sites to B-sites being in a range of 1:1 to 1:0.9, said film being formed by plasma spraying.

In the above processes, lanthanum chromite is a composite oxide having a perovskite type structure, and is composed mainly of lanthanum and chromium. In the perovskite type structure, a crystallographic location where lanthanum occupies is called A-site, and a crystallographic location where chromium occupies is called B-site. A metal element other than lanthanum (calcium, strontium or the like) may be present in a part of the A-sites, and a metal element other than chromium (copper, zinc, cobalt, nickel, manganese or the like) may be present in a part of the B-sites.

The step of plasma spraying the plasma spray powder onto the substrate includes both a case where the plasma spray powder is plasma sprayed onto the surface of the substrate and a case where another film such as an air electrode film is provided on the surface of the substrate and then the plasma spray powder is plasma sprayed onto this film.

The step of forming the lanthanum chromite film on the surface of an air electrode or a fuel electrode includes both a case where lanthanum chromite is formed on the surface of an air electrode film or an fuel electrode film provided on the surface of a porous substrate and a case where the lanthanum chromite film is formed on a surface of an air electrode substrate made of an air electrode material or a fuel electrode substrate made of a fuel electrode material. When chromium oxide is added, it is preferable that an addition amount of chromium oxide is selected to give the composition ratio of the A-sites and the B-sites being 1:1.03 or more.

In the present invention, the plasma spray powder is obtained by mixing 1–15 parts by weight of chromium oxide powder to 100 parts by weight of lanthanum chromite powder having the composition ratio between the A-site and the B-sites being in a range of 1:1 to 1:0.9. Alternatively, the mixed powder is obtained by mixing 1–15 parts by weight of chromium oxide to 100 parts by weight of a synthesis powder which produces, through heating, lanthanum chromite having the composition ratio between the A-sites and the B-sites being in a range of 1:1 to 1:0.9, a synthesized product is obtained by heating the mixed powder, and the plasma spray powder is obtained by granulating this synthesized product. Alternatively, the plasma spray powder is obtained by granulating the above mixed powder.

It is discovered that when an excess amount of the chromium oxide component is preliminarily incorporated with respect to the target composition having the composition ratio between the A-sites and the B-sites being in a range of 1:1 to 1:0.9 as mentioned above, the lanthanum oxide phase or the calcium oxide phase does not precipitate in the lanthanum chromite film. It is considered that this is because chromium oxide evaporated during the plasma spraying is supplemented by this excess amount of chromium oxide. By so doing, according to the present invention, the dense and single phase lanthanum chromite film free from the precipitation of lanthanum oxide or calcium oxide can be obtained by heat treating the plasma sprayed film. Thus, the lanthanum chromite film having low electric resistance and stability for a long time as characteristics of the film can be produced.

Further, when the present invention is applied to the SOFC, the dense interconnector having low electric resistance and stability for a long time can be formed. Consequently, electric resistance of the interconnector can be reduced, and output of the cell can be increased corresponding to reduction in electric resistance. Furthermore, the SOFC can be stably operated for a long time.

It is important that the addition amount of chromium oxide powder is limited to 1–15 parts by weight relative to 100 parts by weight of lanthanum chromite. If the addition amount is less than 1 part by weight, the $La_2O_3$ phase or the CaO phase precipitates in the lanthanum chromite film. If the addition amount is more than 15 parts by weight, an excess amount of chromium oxide remains in the lanthanum chromite film, which deteriorates sinterability of the film. Further, the addition amount of chromium oxide powder is preferably 3–15 parts by weight relative to 100 parts by weight of lanthanum chromite, because the electric conductivity becomes greater in this case.

Among the above producing processes according to the present invention, as compared with the case where the mixed powder is granulated, the process is more excellent, in which the synthesized product is produced by heating the mixed powder, and the plasma spray powder is produced by granulating the synthesized product. It is found out that in the case that the lanthanum chromite in which an excess amount of the chromium component is present by preliminarily heating before the plasma spraying, the porosity of the finally obtained lanthanum chromite film is more greatly reduced, and the electric conductivity of the lanthanum chromite film is further lowered.

The temperature of the heat treatment is preferably 1,250° C. to 1,500° C. If the temperature is less than 1,250° C., the $N_2$ gas permeation constant (mentioned later) of the lanthanum chromite film becomes so great that gas tightness becomes insufficient. On the other hand, if the temperature is more than 1,500° C., the substrate is likely to be deformed. For example, an air electrode substrate made of lanthanum manganite is shrunk when the heating temperature is more than 1,500° C. so that the lanthanum chromite film (interconnector) formed on the substrate is peeled from the air electrode substrate.

Since the lanthanum chromite film produced by the process of the present invention is characterized in that the lanthanum chromite film can be made denser and thinner, a high temperature corrosion-resistant conductor can be produced by plasma spraying a film of this lanthanum chromite on a surface of a metal besides the interconnector of the fuel electrode.

These and other objects, features and advantages of the invention will be appreciated upon reading of the following description of the invention when taken in conjunction with the attached drawings, with the understanding that some modifications, variations and changes of the same could be easily made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
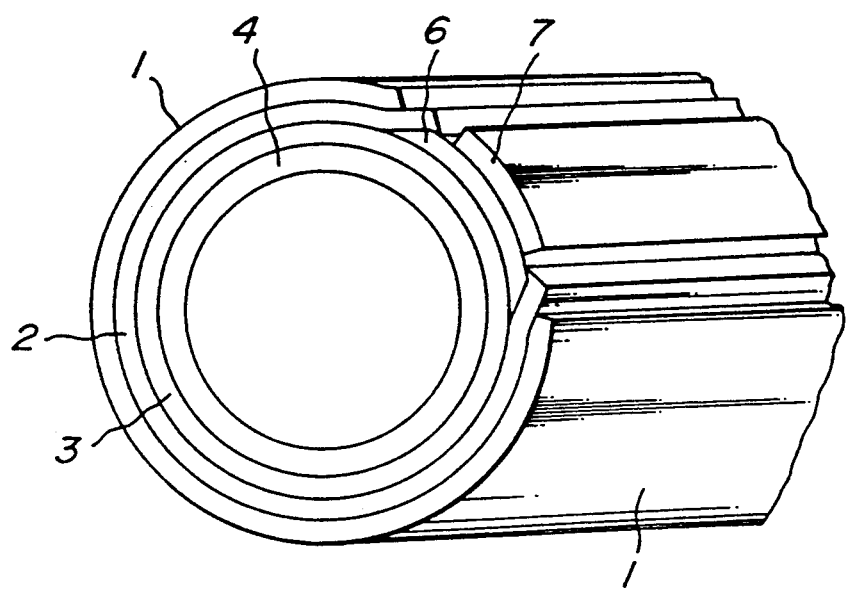
FIG. 1 is a perspective view of a cut tubular SOFC as viewed from one end.

The producing processes of the present invention will be explained in more detail.

According to the first aspect of the present invention, powdery lanthanum chromite having a composition ratio between the A-site and the B-site being in a range of 1:1 to 1:0.9 is produced. In order to synthesize lanthanum chromite, a mixture or a solid solution containing at least $La_2O_3$ and $Cr_2O_3$ is used. In this case, lanthanum chromite may be doped with a metal oxide such as CaO, SrO, CuO and/or ZnO. It is preferable that the thus synthesized lanthanum chromite is pulverized, a slurry is prepared by adding a solvent such as water into the pulverized powder, and the slurry is dried, and granulated.

At that time, the particle diameter distribution of the granulated powder is preferably in a range of 5-150 $\mu$m. If the lower limit of the particle diameter distribution is less than 5 $\mu$m, the grains are so fine that a given amount of the raw material powder cannot be fed to a plasma sprayer from a raw material feeding device, thus making plasma spraying difficult. If the upper limit of the particle diameter distribution is more than 150 $\mu$m, the powder is not melted during the spraying so that the powder adheres to the substrate and the film is unlikely to be densified. The particle diameter distribution is determined by the laser diffraction method.

According to the second aspect of the present invention, a mixed powder is obtained by adding 1-15 parts by weight of powdery chromium oxide to 100 parts by weight of a powder for synthesis of lanthanum chromite (herein referred to "synthesis powder"), a synthesized product is obtained by heating the mixed powder, and powder for the plasma spraying (herein referred to as "plasma spray powder") is obtained by granulating the synthesized product. The synthesis powder may be a mixture or a solid solution containing chromium oxide and lanthanum oxide. Further, the above-mentioned metal compound may be added into the synthesis powder. It is preferable that after lanthanum chromite is synthesized by heating the mixed powder, the synthesized product is pulverized, a slurry is obtained by adding a solvent such as water to the pulverized powder, and the slurry is dried and then granulated.

According to the third aspect of the present invention, a mixed powder is obtained by adding 1-15 parts by weight of chromium oxide powder to 100 parts by weight of the above raw material powder, and a plasma spray powder is obtained by granulating the mixed powder. At that time, the above raw material powder may be a mixture or a solid solution containing chromium oxide or lanthanum oxide. Further, the above metal compound may be added into the raw material powder. It is preferable that a slurry is obtained by adding a solvent such as water to the mixed powder, the slurry is dried, and the dried material is granulated.

The plasma spraying may be plasma spraying under ordinary pressure or plasma spraying under reduced pressure.

Then, an SOFC to which the producing process according to the present invention may be applied will be explained.

FIG. 1 is a perspective view of a cut tubular SOFC.

In FIG. 1, an air electrode film 3 is provided around an outer periphery of a tubular porous ceramic substrate 4, and a solid electrolyte film 2 and a fuel electrode film 1 are provided around the outer periphery of the air electrode film 3. Further, an interconnector 6 is provided on the air electrode film 3 in an upper side of the SOFC in FIG. 1, and a connecting terminal 7 is attached onto the interconnector 6. In order to connect such tubular SOFCs in series, the air electrode film 3 of a certain SOFC is connected to an adjacent SOFC through the interconnector 6 and the connecting terminal 7. On the other hand, in order to connect the tubular SOFCs in parallel, the fuel electrode films 1 of the adjacent SOFCs 1 are connected through an Ni felt or the like. The interconnector 6 is formed by forming a plasma sprayed film on a surface of the air electrode film 3 provided around the porous substrate 4 and heating the film according to the present invention.

Figure 2:
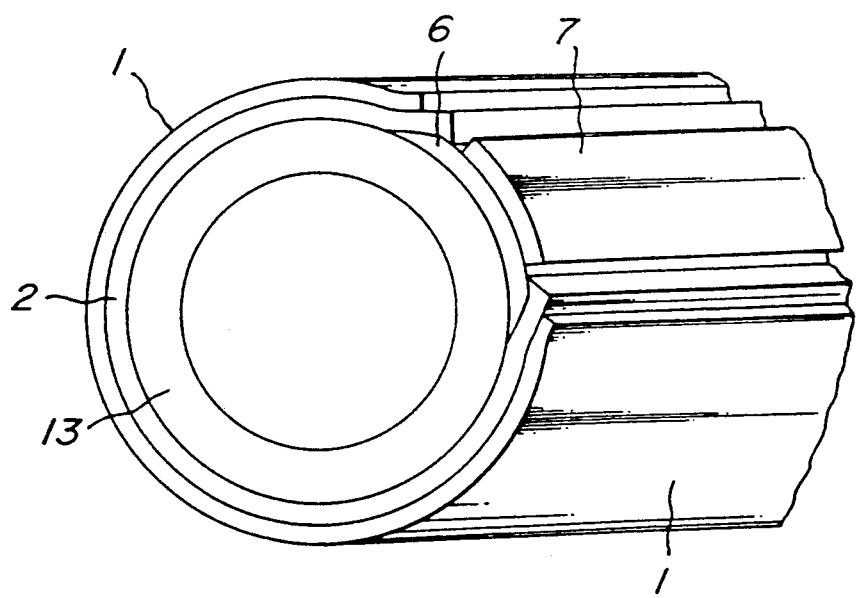
FIG. 2 is a perspective view of another cut tubular SOFC as viewed from one end.

In FIG. 1, the arrangement order of the fuel electrode film 1 and the air electrode film may be reversed. Further, instead of the provision of the air electrode film 3 on the surface of the porous substrate 4, a single layer-shaped tubular air electrode substrate 13 made of a porous air electrode material may be used as shown in FIG. 2. In this case, an interconnector 6 is provided directly on the surface of the tubular air electrode substrate 13.

Opposite ends of the tubular SOFC may be opened, or one of the opposite ends may be closed to form an SOFC having a bottomed pipe shape.

The air electrode may be produced by using $LaMnO_3$, $CaMnO_3$, $LaNiO_3$, $LaCoO_3$, $LaCrO_3$ or the like doped or not doped, and $LaMnO_3$ doped with strontium or calcium is preferred. The fuel electrode is preferably made of nickel-zirconia cermet or cobalt-zirconia cermet. The solid electrolyte is preferably made of zirconium oxide fully stabilized or partially stabilized with a rare earth metal element or compound such as yttria.

Alternatively, the solid electrolyte is preferably made of cerium oxide containing a rare earth element.

oxide or calcium oxide was confirmed by X-ray diffraction. Results are shown in Table 1.

TABLE 1

| Composition of synthesized lanthanum chromite | Timing of addition of $Cr_2O_3$ | Amount of $Cr_2O_3$ added (parts by weight) | Temp. of heat treatment (°C.) | Electric conductivity (S/cm) | Composition of lanthanum chromite film (measured values) | Presence or absence of $La_2O_3$ or CaO |
|---|---|---|---|---|---|---|
| $La(Cr_{0.8}Cu_{0.2})O_3$ | after* synthesis | 2.0 | 1450 | 12.5 | $La(Cr_{0.97}Cu_{0.2})O_3$ | absent |
| $La(Cr_{0.8}Zn_{0.2})O_3$ | after synthesis | 2.0 | 1450 | 12.0 | $La(Cr_{0.8}Zn_{0.2})O_3$ | absent |
| $(La_{0.8}Sr_{0.2})Cr_{0.97}O_3$ | after synthesis | 5.0 | 1450 | 30.0 | $(La_{0.8}Sr_{0.2})Cr_{0.96}O_3$ | absent |
| $(La_{0.8}Sr_{0.2})Cr_{0.97}O_3$ | after synthesis | 2.0 | 1450 | 18.0 | $(La_{0.8}Sr_{0.2})Cr_{0.91}O_3$ | absent |
| $(La_{0.8}Sr_{0.2})Cr_{0.97}O_3$ | after synthesis | 3.0 | 1450 | 23.6 | $(La_{0.8}Sr_{0.2})Cr_{0.95}O_3$ | absent |
| $(La_{0.8}Sr_{0.2})Cr_{0.97}O_3$ | after synthesis | 10.0 | 1450 | 28.5 | $(La_{0.8}Sr_{0.2})Cr_{0.96}O_3$ | absent |
| $(La_{0.8}Sr_{0.2})Cr_{0.97}O_3$ | after synthesis | 15.0 | 1450 | 29.2 | $(La_{0.8}Sr_{0.2})Cr_{0.98}O_3$ | absent |
| $(La_{0.7}Ca_{0.3})Cr_{0.97}O_3$ | after synthesis | 5.0 | 1450 | 40.5 | $(La_{0.7}Ca_{0.3})Cr_{0.97}O_3$ | absent |
| $LaCrO_3$ | after synthesis | 15.0 | 1450 | 8.2 | $LaCrO_3$ | absent |
| $(La_{0.8}Sr_{0.2})Cr_{0.95}O_3$ | after synthesis | 0 | 1450 | 4.0 | $(La_{0.8}Sr_{0.2})Cr_{0.80}O_3$ | present |
| $(La_{0.8}Ca_{0.2})Cr_{0.95}O_3$ | after synthesis | 0.5 | 1450 | 6.0 | $(La_{0.8}Ca_{0.2})Cr_{0.85}O_3$ | present |
| $(La_{0.8}Sr_{0.2})Cr_{0.95}O_3$ | after synthesis | 16.0 | 1450 | 0.8 | $(La_{0.8}Sr_{0.2})Cr_{1.05}O_3$ | absent |

*The expression "after synthesis" means herein that $Cr_2O_3$ was added after lanthanum chromite was synthesized.

In the following, experimental results will be concretely explained.

Experiment 1

First, powdery lanthanum chromite was synthesized. More particularly, powdery raw materials were measured to give a composition shown in Table 1, and 100 parts by weight of water and 300 parts by weight of zirconia grinding media were added to totally 100 parts by weight of those raw materials. The mixture was ground and mixed in a ball mill for 16 hours, thereby obtaining a slurry. This slurry was dried at 110° C., and the dried material was pulverized to not more than 149 μm, and calcined at 1,300° C. in air for 5 hours, thereby obtaining synthesized lanthanum chromite having an intended composition. This lanthanum chromite was crushed, ground and mixed as mentioned above, thereby obtaining a slurry. Then, powdery lanthanum chromite having a particle diameter distribution of 5–40 μm was obtained from this slurry by using a spray drier. Into 100 parts by weight of this powdery lanthanum chromite was mixed powdery chromium oxide in a weight shown in Table 1, thereby obtaining a plasma spray powder.

A flat substrate having a size of a longitudinal length: 30 mm, a lateral length: 30 mm, and a thickness: 1 mm and made of alumina was prepared. This substrate had a porosity of 30%. A plasma sprayed film was formed by plasma spraying the above plasma spray powder on the substrate to a thickness of 500 μm by using the plasma sprayer. Thereafter, the flat substrate was removed by grinding, thereby obtaining a plasma sprayed film having a thickness of 400 μm. This plasma sprayed film was placed in an electric furnace, and heated at a heating temperature shown in Table 1. With respect to the resulting lanthanum chromite films, electric conductivity was measured, ingredients were chemically analyzed, and presence or absence of precipitated lanthanum The electric conductivity of the lanthanum chromite film was measured as follows. That is, the lanthanum chromite was cut in the form of a round disc having a diameter of 14 mm and a thickness of 0.4 mm, platinum electrodes were formed on the film, and then the electric conductivity was measured at 1,000° C. in air according to an AC impedance process.

As is seen from Table 1, when not less than 1 parts by weight of powdery chromium oxide is added into 100 parts by weight of powdery lanthanum chromite, neither $La_2O_3$ phase nor CaO phase precipitate, and the lanthanum chromite film having a single phase can be obtained. On the other hand, when the addition amount of chromium oxide is more than 15.0 parts by weight, the electric conductivity of the film rapidly drops.

Experiment 2

Powdery metal compounds ($La_2O_3$, $Cr_2O_3$, CuO, ZnO, $CaCO_3$, $SrCO_3$) were measured to give a composition shown in Table 2, and a synthesis powder was prepared from these metal compounds. To 100 parts by weight of the synthesis powder was added powdery chromium oxide in a weight shown in Table 2 to obtain a mixed powder. To 100 parts by weight of the mixed powder were added 100 parts by weight of water and 300 parts by weight of zirconia grinding media, and the resulting mixture was placed in a ball mill, and ground and mixed there for 16 hours, thereby obtaining a slurry. The slurry was dried at 110° C., and the dried material was pulverized to not more than 149 μm and calcined at 1,300° C. in air for 5 hours, thereby obtaining a synthesized product. This synthesized product was pulverized, and ground and mixed in the same manner as mentioned above, thereby obtaining a slurry. A plasma spray powder having the particle diameter distribution of 5–40 μm was obtained from this slurry by using the spray drier.

A lanthanum chromite film was obtained in completely the same manner as in Experiment 1 by using the thus obtained plasma spray powder. With respect to the resulting lanthanum chromite films, the same measurements and analysis as in Experiment 1 were effected. Results are shown in Table 2.

Into 100 parts by weight of a powdery raw material was added and mixed powdery chromium oxide in a weight shown in Table 3, thereby obtaining a mixed powder. To 100 parts by weight of the mixed powder

TABLE 2

| Composition of lanthanum chromite produced by heating synthesis powder | Timing of addition of $Cr_2O_3$ | Amount of $Cr_2O_3$ added (parts by weight) | Temp. of heat treatment (°C.) | Electric conductivity (S/cm) | Composition of lanthanum chromite film (measured values) | Presence or absence of $La_2O_3$ or CaO |
|---|---|---|---|---|---|---|
| $La(Cr_{0.9}Cu_{0.1})O_3$ | before** synthesis | 1.0 | 1450 | 12.8 | $La(Cr_{0.89}Cu_{0.1})O_3$ | absent |
| $La(Cr_{0.9}Zn_{0.1})O_3$ | before synthesis | 2.0 | 1450 | 11.9 | $La(Cr_{0.90}Zn_{0.1})O_3$ | absent |
| $(La_{0.9}Ca_{0.1})Cr_{0.93}O_3$ | before synthesis | 4.0 | 1450 | 24.4 | $(La_{0.9}Ca_{0.1})Cr_{0.94}O_3$ | absent |
| $(La_{0.9}Ca_{0.1})Cr_{0.93}O_3$ | before synthesis | 2.0 | 1450 | 14.5 | $(La_{0.9}Ca_{0.1})Cr_{0.90}O_3$ | absent |
| $(La_{0.9}Ca_{0.1})Cr_{0.93}O_3$ | before synthesis | 7.0 | 1450 | 25.0 | $(La_{0.9}Ca_{0.1})Cr_{0.97}O_3$ | absent |
| $(La_{0.9}Ca_{0.1})Cr_{0.93}O_3$ | before synthesis | 10.0 | 1450 | 24.1 | $(La_{0.9}Ca_{0.1})Cr_{0.96}O_3$ | absent |
| $(La_{0.9}Ca_{0.1})Cr_{0.93}O_3$ | before synthesis | 15.0 | 1450 | 22.8 | $(La_{0.9}Ca_{0.1})Cr_{0.98}O_3$ | absent |
| $(La_{0.9}Sr_{0.1})Cr_{0.95}O_3$ | before synthesis | 7.0 | 1450 | 20.6 | $(La_{0.9}Sr_{0.1})Cr_{0.97}O_3$ | absent |
| $LaCrO_3$ | before synthesis | 15.0 | 1450 | 8.0 | $LaCr_{0.98}O_3$ | absent |
| $(La_{0.8}Ca_{0.2})Cr_{0.95}O_3$ | before synthesis | 0 | 1450 | 3.3 | $(La_{0.8}Ca_{0.2})Cr_{0.83}O_3$ | present |
| $(La_{0.8}Sr_{0.2})Cr_{0.95}O_3$ | before synthesis | 0.5 | 1450 | 5.0 | $(La_{0.8}Sr_{0.2})Cr_{0.86}O_3$ | present |
| $(La_{0.8}Ca_{0.2})Cr_{0.95}O_3$ | before synthesis | 16.0 | 1450 | 0.3 | $(La_{0.8}Ca_{0.2})Cr_{1.05}O_3$ | absent |

**The expression "before synthesis" means herein that $Cr_2O_3$ was added before lanthanum chromite was synthesized.

As is seen from Table 2, when the synthesized powder is produced as plasma spray powder from the mixture obtained by adding not less than 1 parts by weight of powdery chromium oxide into 100 parts by weight of the synthesis powder for lanthanum chromite, neither $La_2O_3$ phase nor CaO phase precipitate, and the lanthanum chromite film having a single phase can be obtained. On the other hand, when the addition amount of chromium oxide is more than 15.0 parts by weight, the electric conductivity of the film rapidly drops.

Experiment 3

Powdery metal oxides were measured to produce were added 100 parts by weight of water and 300 parts by weight of zirconia grinding media, and the resulting mixture was placed into the ball mill, and ground and mixed for 16 hours, thereby obtaining a slurry. A plasma spray powder having a particle diameter distribution of 5–40 μm was obtained by granulating this slurry with use of the spray drier.

A lanthanum chromite was obtained in completely the same manner as in Experiment 1 by using the thus obtained plasma spray powder. With respect to the resulting lanthanum chromite films, the same measurements and analysis as in Experiment 1 were effected. Results are shown in Table 3.

TABLE 3

| Intended Composition of plasma sprayed film | Synthesized or not | Amount of $Cr_2O_3$ added (parts by weight) | Temp. of heat treatment (°C.) | Electric conductivity (S/cm) | Composition of lanthanum chromite film (measured values) | Presence or absence of $La_2O_3$ or CaO |
|---|---|---|---|---|---|---|
| $La(Cr_{0.9}Cu_{0.1})O_3$ | not synthesized | 4.0 | 1450 | 8.8 | $La(Cr_{0.9}Cu_{0.1})O_3$ | absent |
| $(La_{0.9}Ca_{0.1})Cr_{0.93}O_3$ | not synthesized | 7.0 | 1450 | 16.4 | $(La_{0.9}Ca_{0.1})Cr_{0.94}O_3$ | absent |
| $(La_{0.9}Ca_{0.1})Cr_{0.93}O_3$ | not synthesized | 6.0 | 1450 | 10.5 | $(La_{0.9}Ca_{0.1})Cr_{0.90}O_3$ | absent |
| $(La_{0.9}Sr_{0.1})Cr_{0.95}O_3$ | not synthesized | 9.0 | 1450 | 18.4 | $(La_{0.9}Sr_{0.1})Cr_{0.95}O_3$ | absent |
| $(La_{0.9}Ca_{0.1})Cr_{0.93}O_3$ | not synthesized | 13.0 | 1450 | 19.1 | $(La_{0.9}Ca_{0.1})Cr_{0.96}O_3$ | absent |
| $(La_{0.9}Sr_{0.1})Cr_{0.97}O_3$ | not synthesized | 15.0 | 1450 | 18.8 | $(La_{0.9}Sr_{0.1})Cr_{0.95}O_3$ | absent |
| $(La_{0.8}Ca_{0.2})Cr_{0.95}O_3$ | not synthesized | 0 | 1450 | 3.0 | $(La_{0.8}Ca_{0.2})Cr_{0.80}O_3$ | present |
| $(La_{0.9}Sr_{0.1})Cr_{0.95}O_3$ | not synthesized | 0.5 | 1450 | 4.0 | $(La_{0.9}Sr_{0.1})Cr_{0.84}O_3$ | present |
| $(La_{0.9}Ca_{0.1})Cr_{0.95}O_3$ | not synthesized | 18.0 | 1500 | 0.2 | $(La_{0.9}Ca_{0.1})Cr_{1.05}O_3$ | absent | lanthanum chromite having a composition shown in Table 3, and a powdery raw material was obtained from these metal oxides.

As is seen from Table 3, when not less than 1 parts by weight of powdery chromium oxide is added into 100 parts by weight of powdery lanthanum chromite, neither $La_2O_3$ phase nor CaO phase precipitate.

When the samples in Table 3 are compared with the respective samples having the same composition and temperature of the heat treatment as shown in Table 2, the electric conductivity of the finally obtained lanthanum chromite film is higher in the case that the powdery raw material is once heated to obtain the synthesized product, and the thus synthesized product is granulated.

Experiment 4

Plasma spray powders were prepared in the same manner as described in Experiment 1, provided that a composition of powdery lanthanum chromite and an addition amount of powdery chromium oxide were as shown in Table 4. Each plasma spray powder was plasma sprayed onto a surface of a tubular air electrode substrate made of a porous air electrode material in a thickness of 100 μm by using the plasma sprayer. Then, this plasma sprayed substrate was placed in the electric furnace, and heated at a temperature shown in Table 4. With respect to the thus obtained lanthanum chromite film, the $N_2$ gas permeation constant was measured, and the presence or absence of precipitated lanthanum oxide or calcium oxide was confirmed by X-ray diffraction. Results are shown in Table 4.

film will not peel from the air electrode substrate due to the deformation of the substrate.

Experiment 5

$La_2O_3$, 106.1 g with purity of 99.9%, $MnO_2$, 68.4 g with purity of 96%, and $SrCO_3$, 10.8 g with purity of 99.1% were measured. The thus measured three kinds of the compounds were placed in a 2-liter ball mill together with 800 g of grinding media and 200 g of water, and a slurry was obtained by mixing the mixture for 3 hours. The slurry was dried at 110° C. for 20 hours, and the dried material was pulverized to not more than 149 μm, and calcined at 1,200° C. in air for 10 hours, thereby synthesizing $La_{0.9}Sr_{0.1}MnO_3$.

The starting materials for the synthesis of these compositions are not necessarily limited to the oxides, but carbonates, nitrates, acetates, sulfates or hydroxides thereof may be used. The synthesis process is not necessarily limited to the solid phase reaction process mentioned above, but a co-precipitation process using a solution or pyrolysis of an organic acid salt may be employed.

Then, the synthesized product was pulverized and ground in the ball mill to obtain a powder having the average particle diameter of 1 μm, and then 20 wt % of cellose was added and mixed into the powder. Then, the mixture was shaped in a tubular form having an inner

TABLE 4

| Composition of synthesized lanthanum chromite | Timing of addition of $Cr_2O_3$ | Amount of $Cr_2O_3$ added (parts by weight) | Temp. of heat treatment (°C.) | $N_2$ gas-permeating constant | Composition of lanthanum chromite film (measured values) | Presence or absence of $La_2O_3$ or CaO |
|---|---|---|---|---|---|---|
| $(La_{0.8}Ca_{0.2})Cr_{0.95}O_3$ | after synthesis | 5.0 | 1250 | 0.94 | $(La_{0.8}Ca_{0.2})Cr_{0.96}O_3$ | absent |
| $(La_{0.8}Ca_{0.2})Cr_{0.95}O_3$ | after synthesis | 5.0 | 1350 | 0.56 | $(La_{0.8}Ca_{0.2})Cr_{0.95}O_3$ | absent |
| $(La_{0.8}Ca_{0.2})Cr_{0.95}O_3$ | after synthesis | 5.0 | 1450 | 0.097 | $(La_{0.8}Ca_{0.2})Cr_{0.94}O_3$ | absent |
| $(La_{0.8}Ca_{0.2})Cr_{0.95}O_3$ | after synthesis | 5.0 | 1500 | 0.087 | $(La_{0.8}Ca_{0.2})Cr_{0.95}O_3$ | absent |
| $(La_{0.8}Ca_{0.2})Cr_{0.95}O_3$ | after synthesis | 5.0 | 1200 | 7.5 | $(La_{0.8}Ca_{0.2})Cr_{0.97}O_3$ | absent |
| $(La_{0.8}Ca_{0.2})Cr_{0.95}O_3$ | after synthesis | 5.0 | 1550 | peeled | $(La_{0.8}Ca_{0.2})Cr_{0.95}O_3$ | absent |

Figure 3:
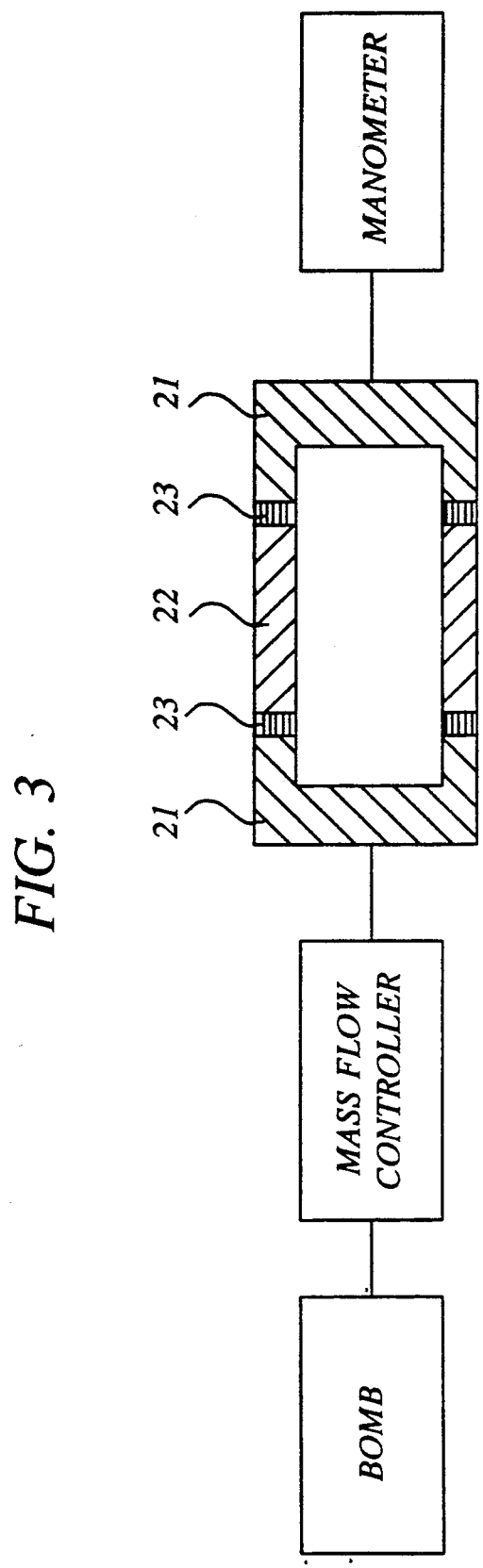
FIG. 3 is a schematic view of a device for measuring an $N_2$ gas permeation constant.

The $N_2$ gas permeation constant was measured as follows:

That is, measurement was effected as schematically shown in FIG. 3. The thus obtained tubular laminate 22 of the tubular air electrode substrate and the lanthanum chromite film was set between jigs 21, and the laminate 22 was bonded to the jigs 21 with an adhesive. Nitrogen gas was fed from a bomb into the jig up to 1.1 atmospheric pressure. At that time, an amount of nitrogen gas leaking through the laminate was measured by a mass flow controller, and the $N_2$ gas permeation constant $K$ ($cm^4 g^{-1} s^{-1}$) was determined according to the following expression.

$K = (t/Q)/(\Delta P \cdot A)$ in which t is a thickness of the sample (cm), Q is a measured flow rate ($cm^3/s$), Δp is pressure difference ($g/cm^2$), and A is an area of an opening.

As shown in Table 4, when $Cr_2O_3$ is added, neither $La_2O_3$ nor CaO precipitate. In addition, when the temperature of the heat treatment is set in a range of 1,250° C. to 1,500° C., the $N_2$ gas permeation constant becomes very small, the gas tightness of the lanthanum chromite film increases, and the lanthanum chromite diameter of 16 mm and an outer diameter of 20 mm by rubber press. The shaped body was fired at 1,500° C. for 10 hours, thereby obtaining a porous air electrode substrate.

Each of the lanthanum chromite plasma spray raw materials synthesized in Experiments 1 through 4 was plasma sprayed onto a surface of the thus prepared substrate in a thickness of 100 μm in the state that the tubular substrate was masked to plasma spray the raw material over a width of 5 mm in an axial direction of the tubular substrate. Then, the plasma sprayed lanthanum chromite portion only was masked, and then yttria-stabilized zirconia (YSZ) was plasma sprayed as a solid electrolyte material onto the remaining portion in a thickness of 100 μm. Thereafter, the thus obtained structural body was entirely heated at 1,500° C. for 5 hours, thereby obtaining an interconnector film made of the dense lanthanum chromite. Then, a slurry of Ni-/YSZ=4/6 (weight ratio) was coated onto the surface of the solid electrolyte film, which was fired at 1,300° C. for 5 hours to convert the slurry to a fuel electrode. Thereby, a cell unit of a fuel cell was prepared. FIG. 2 shows a perspective view of this cell unit.

According to the producing process of the present invention, since $Cr_2O_3$ evaporating during the plasma spraying is added in an excess amount before the spraying, the composition of the plasma sprayed film does not largely differ from that of the plasma spray raw material. When the plasma sprayed film is heated, the dense and single phase lanthanum chromite film free from precipitation of lanthanum oxide or calcium oxide can be obtained. Therefore, the lanthanum chromite film having low electric resistance and stability for a long time can be produced.

In addition, when the interconnector of the SOFC is formed by such a dense lanthanum chromite film having low electric resistance, the electric resistance of the interconnector can be reduced, and thus the resistance of the cell itself can be reduced. Consequently, the outputs of the cell can be increased.

What is claimed is:

1. A process for the production of a lanthanum chromite film, said process comprising the steps of preparing a plasma spray powder by mixing 1–15 parts by weight of powdery chromium oxide to 100 parts by weight of powdery lanthanum chromite, said lanthanum chromite having a composition ratio of A-sites to B-sites being in a range of 1:1 to 1:0.9, forming a plasma sprayed film by plasma spraying said plasma spray powder onto a substrate, and forming the lanthanum chromite film by heat treating the resulting plasma sprayed film.

2. The process according to claim 1, wherein said lanthanum chromite film is formed as an interconnector on a surface of an air electrode or a fuel electrode of a solid oxide fuel cell.

3. The process according to claim 2, wherein said air electrode is a porous tubular air electrode substrate comprising an air electrode material.

4. The process according to claim 1, wherein said heat treating of said plasma sprayed film is performed at a temperature ranging from 1,250° C. to 1,500° C.

5. A process for producing a lanthanum chromite film, said process comprising the steps of preparing a mixed powder by adding 1–15 parts by weight of powdery chromium oxide to 100 parts by weight of a synthesis powder capable of producing said lanthanum chromite film by heat treatment, said synthesis powder containing at least chromium oxide and lanthanum oxide and said lanthanum chromite film having a composition ratio of A-site to B-sites being in a range of 1:1 to 1:0.9, obtaining a synthesized product by heating said mixed powder, preparing a plasma spray powder by granulating said synthesized product, forming a plasma sprayed film onto a substrate by plasma spraying said plasma spray powder onto said substrate, and forming the lanthanum chromite film by heat treating the resulting plasma sprayed film.

6. The process according to claim 5, wherein said lanthanum chromite film is formed as an interconnector on a surface of an air electrode or a fuel electrode of a solid oxide fuel cell.

7. The process according to claim 6, wherein said air electrode is a porous tubular air electrode substrate comprising an air electrode material.

8. The process according to claim 5, wherein said heat treating of said plasma sprayed film is performed at a temperature ranging from 1,250° C. to 1,500° C.

9. A process for producing a lanthanum chromite film, said process comprising the steps of preparing a mixed powder by adding 1–15 parts by weight of powdery chromium oxide to 100 parts by weight of a raw material powder capable of producing said lanthanum chromite film by heat treatment, said raw material powder containing at least chromium oxide and lanthanum oxide and said lanthanum chromite film having a composition ratio of A-sites to B-sites being in a range of 1:1 to 1:0.9, obtaining a plasma spray powder by granulating said mixed powder, forming a plasma sprayed film onto a substrate by plasma spraying said plasma spray powder onto said substrate, and forming the lanthanum chromite film by heat treating the resulting plasma sprayed film.

10. The process according to claim 9, wherein said lanthanum chromite film is formed as an interconnector on a surface of an air electrode or a fuel electrode of a solid oxide fuel cell.

11. The process according to claim 10, wherein said air electrode is a porous tubular air electrode substrate comprising an air electrode material.

12. The process according to claim 9, wherein said heat treating of said plasma sprayed film is performed at a temperature ranging from 1,250° C. to 1,500° C.

* * * * *